(12) United States Patent
Matian et al.

(10) Patent No.: US 10,297,847 B2
(45) Date of Patent: May 21, 2019

(54) SOFC SYSTEM AND METHOD OF OPERATING A SOFC SYSTEM

(71) Applicant: HTCERAMIX S.A., Yverdon-les-Bains (CH)

(72) Inventors: Mardit Matian, Geneva (CH); Olivier Bucheli, Adligenswil (CH)

(73) Assignee: HTCERAMIX S.A., Yverdon-les Bains (CH)

( * ) Notice: Subject to any disclaimer, the term of this patent is extended or adjusted under 35 U.S.C. 154(b) by 136 days.

(21) Appl. No.: 15/532,288

(22) PCT Filed: Nov. 30, 2015

(86) PCT No.: PCT/EP2015/078097
§ 371 (c)(1),
(2) Date: Jun. 1, 2017

(87) PCT Pub. No.: WO2016/087389
PCT Pub. Date: Jun. 9, 2016

(65) Prior Publication Data
US 2017/0331132 A1    Nov. 16, 2017

(30) Foreign Application Priority Data
Dec. 1, 2014    (EP) ................................... 14195621

(51) Int. Cl.
*H01M 8/06* (2016.01)
*C01B 3/38* (2006.01)
(Continued)

(52) U.S. Cl.
CPC ............ *H01M 8/0618* (2013.01); *C01B 3/38* (2013.01); *C01B 3/48* (2013.01);
(Continued)

(58) Field of Classification Search
None
See application file for complete search history.

(56) References Cited

U.S. PATENT DOCUMENTS

| 4,943,493 A | 7/1990 | Vartanian |
|---|---|---|
| 9,365,351 B2 | 6/2016 | Kamps |

(Continued)

FOREIGN PATENT DOCUMENTS

| JP | 2005026059 | 1/2005 |
|---|---|---|
| JP | 2005243470 | 9/2005 |

(Continued)

OTHER PUBLICATIONS

International Search Report for PCT/EP2015/078097, Completed by the European Patent Office on Feb. 8, 2016, 5 Pages.

(Continued)

*Primary Examiner* — Scott J. Chmielecki
(74) *Attorney, Agent, or Firm* — Brooks Kushman P.C.

(57) ABSTRACT

A SOFC system having a fuel reformer for reforming a gaseous hydrocarbon stream and steam into a hydrogen rich gas, a solid oxide fuel cell stack including an anode and a cathode for electrochemically reacting the hydrogen rich gas and a cathode air stream to produce electricity, an anode exhaust stream and a cathode depleted air stream. The anode exhaust stream and the cathode depleted air stream are kept separate, a burner for combusting a mixture of the anode exhaust stream and a fresh air stream to complete combustion and produce heat for the reformer control unit and a blower are also provided. The control unit controlling the blower for controlling the mass flow rate of the fresh air stream to provide heat to the reformer to reform the gaseous hydrocarbon stream and to produce a burner exhaust stream.

14 Claims, 5 Drawing Sheets

(51) Int. Cl.

| | | |
|---|---|---|
| *C01B 3/48* | (2006.01) | |
| *H01M 8/0612* | (2016.01) | |
| *H01M 8/04014* | (2016.01) | |
| *H01M 8/0444* | (2016.01) | |
| *H01M 8/04089* | (2016.01) | |
| *H01M 8/04119* | (2016.01) | |
| *H01M 8/04082* | (2016.01) | |
| *H01M 8/04291* | (2016.01) | |
| *H01M 8/0432* | (2016.01) | |
| *H01M 8/04701* | (2016.01) | |
| *H01M 8/04746* | (2016.01) | |
| *H01M 8/04223* | (2016.01) | |
| *H01M 8/124* | (2016.01) | |

(52) U.S. Cl.
CPC ..... *H01M 8/04022* (2013.01); *H01M 8/0444* (2013.01); *H01M 8/04089* (2013.01); *H01M 8/04164* (2013.01); *H01M 8/04201* (2013.01); *H01M 8/04291* (2013.01); *H01M 8/04328* (2013.01); *H01M 8/04373* (2013.01); *H01M 8/04738* (2013.01); *H01M 8/04776* (2013.01); *C01B 2203/0233* (2013.01); *C01B 2203/0283* (2013.01); *C01B 2203/066* (2013.01); *C01B 2203/0827* (2013.01); *C01B 2203/0894* (2013.01); *C01B 2203/1294* (2013.01); *C01B 2203/16* (2013.01); *C01B 2203/1695* (2013.01); *H01M 8/04268* (2013.01); *H01M 2008/1293* (2013.01); *Y02P 20/129* (2015.11)

(56) References Cited

U.S. PATENT DOCUMENTS

| | | | |
|---|---|---|---|
| 2003/0224231 A1* | 12/2003 | Penev | H01M 8/04022 |
| | | | 429/423 |
| 2005/0164051 A1* | 7/2005 | Venkataraman | B01J 8/0257 |
| | | | 429/410 |
| 2006/0046114 A1 | 3/2006 | Kato et al. | |
| 2010/0323257 A1* | 12/2010 | Fujihara | C01B 3/384 |
| | | | 429/423 |
| 2012/0064422 A1 | 3/2012 | Takeuchi | |
| 2015/0221961 A1 | 8/2015 | Takeuchi | |
| 2015/0270559 A1 | 9/2015 | Onuma et al. | |
| 2016/0141692 A1* | 5/2016 | Barnard | H01M 8/0618 |
| | | | 429/413 |

FOREIGN PATENT DOCUMENTS

| | | |
|---|---|---|
| WO | 2011036886 | 3/2011 |
| WO | 2013171265 | 11/2013 |
| WO | 2014171265 | 10/2014 |
| WO | 2014167764 | 2/2017 |

OTHER PUBLICATIONS

European Search Report for European Application No. EP 14195621, Completed by the European Patent Office on Feb. 11, 2015, 2 Pages.
Russian Office Action, dated Feb. 28, 2019,15 pages including translation.

* cited by examiner

SOFC SYSTEM AND METHOD OF OPERATING A SOFC SYSTEM

CROSS-REFERENCE TO RELATED APPLICATION

This application is the U.S. national phase of PCT Application No. PCT/EP2015/078097 filed on Nov. 30, 2015, which claims priority to EP Patent Application No. EP14195621.9 filed on Dec. 1, 2014, the disclosures of which are incorporated in their entirety by reference herein.

FIELD OF THE INVENTION

The field of invention relates to a Solid Oxide Fuel Cell (SOFC) system. The field of invention further relates of a method of operating a Solid Oxide Fuel Cell system.

BACKGROUND OF THE INVENTION

A Solid Oxide Fuel Cell (SOFC) is a device for directly converting the chemical energy of a fuel into electrical energy. Document U.S. Pat. No. 4,943,493 discloses a fuel cell power plant, wherein a hydrocarbon fuel is reformed in a reformer to provide a hydrogen rich fuel stream and the hydrogen rich fuel stream is oxidized in a fuel cell. A stream of anode exhaust and an oxidant stream comprising cathode exhaust and air are combusted in the burner. The fuel cell power plant allows indirect control of the burner flame temperature in that the composition of the oxidant stream are controlled to maintain the oxygen content of the burner exhaust stream within a predetermined range and thus maintain the flame temperature of the combustion mixture within a preferred range.

One disadvantage of this fuel cell power plant is that the control of the combustion in the burner is difficult in view that having a depleted air coming out of the stack at very high flow rate makes the controllability of a complete combustion, which means a combustion that burns all fuel, challenging, especially when the system operates under modulating loads. A further disadvantage is that a relatively large burner is necessary in the system. A further disadvantage is that an external water line and an apparatus for generating steam is necessary to run the system.

Technical Problem to be Solved

The objective of the present invention is thus to provide a Solid Oxide Fuel Cell (SOFC) system that needs no external water line, that is more reliable, economically more advantageous and furthermore easier to control especially in a view to the burner and its control.

SUMMARY OF THE INVENTION

The above-identified objectives are solved by a SOFC system comprising:
- a fuel reformer for reforming a gaseous hydrocarbon stream and steam into a hydrogen rich gas,
- a solid oxide fuel cell stack including an anode and a cathode for electrochemically reacting the hydrogen rich gas and a cathode air stream to produce electricity, an anode exhaust stream and a cathode depleted air stream, wherein the anode exhaust stream and the cathode depleted air stream are kept separate,
- a burner for combusting a mixture of the anode exhaust stream and a fresh air stream to complete combustion and produce heat for the reformer,
- and a control unit and a blower, the control unit controlling the blower for controlling the mass flow rate of the fresh air stream to produce a burner exhaust stream and to provide heat to the reformer to reform the gaseous hydrocarbon stream.

The objective is further in particular solved by a SOFC system comprising:
- a fuel reformer for reforming a gaseous hydrocarbon stream and steam into a hydrogen rich gas,
- a solid oxide fuel cell stack including an anode and a cathode for electrochemically reacting the hydrogen rich gas and a cathode air stream to produce electricity, an anode exhaust stream and a cathode depleted air stream, wherein the anode exhaust stream and the cathode depleted air stream are kept separate,
- a burner for combusting a mixture of the anode exhaust stream and a fresh air stream to complete combustion and produce heat for the reformer,
- and a control unit and a blower, the control unit controlling the blower for controlling the mass flow rate of the fresh air stream to provide heat to the reformer to reform the gaseous hydrocarbon stream and to produce a burner exhaust stream having sufficient heat for generating steam, wherein at least one heat exchanger, an evaporator, is arranged after the burner to cool down the burner exhaust stream and to heat the condensed water to generate steam, wherein the steam is fed to the fuel reformer, and wherein one of the anode exhaust stream and the burner exhaust stream is cooled down to produce condensed water, so that there is no need for an external water line.

The objective is further in particular solved by method for operating a SOFC system comprising: reforming a gaseous hydrocarbon stream and steam into a hydrogen rich gas, electrochemically reacting the hydrogen rich gas and a cathode air stream in a solid oxide fuel cell stack to produce electricity, an anode exhaust stream and a cathode depleted air stream, keeping the anode exhaust stream and the cathode depleted air stream in separate streams, supplying the anode exhaust stream to a burner, supplying a fresh air stream to the burner to provide enough air for a complete combustion in the burner, and burning a combustion mixture of the anode exhaust stream and the fresh air stream to provide heat to the reformer to pre-reform the gaseous hydrocarbon stream and to produce a burner exhaust stream.

The objective is further in particular solved by method for operating a SOFC system comprising:
reforming a gaseous hydrocarbon stream and steam into a hydrogen rich gas, electrochemically reacting the hydrogen rich gas and a cathode air stream in a solid oxide fuel cell stack to produce electricity, an anode exhaust stream and a cathode depleted air stream, keeping the anode exhaust stream and the cathode depleted air stream in separate streams, supplying the anode exhaust stream to a burner, supplying a fresh air stream to the burner to provide enough air for a complete combustion in the burner, burning a combustion mixture of the anode exhaust stream and the fresh air stream to provide heat to the reformer to pre-reform the gaseous hydrocarbon stream and to produce a burner exhaust stream having sufficient heat for generating steam, cooling down the anode exhaust stream or the burner exhaust stream to produce condensed water, and heating the condensed water by the burner exhaust stream to generate the steam, so that there is no need for an external water line.

One advantage of the present invention is that a simpler, more robust control and economically more advantageous Solid Oxide Fuel Cell (SOFC) system is provided. Due to the fact that the anode exhaust stream and the cathode depleted air stream are kept separate, the flow of the anode exhaust stream and the burner exhaust stream are kept low. Therefore a small condensing heat exchanger is required after the anode or the burner to separate and condense the water from the remaining of the anode exhaust stream or the burner exhaust stream. In the SOFC system according to the invention the separated water is fed back into the system and used in the steam reforming unit. The burner is controlled such that the burner exhaust stream provides sufficient heat to an evaporator for generating steam out of the condensed water, so that there is sufficient steam for the fuel reformer, and no external water line is needed.

In view of the state of the art, a unique difference of the present invention is that the anode outlet and the cathode outlet of the fuel cell are not mixed together, and beside a first air blower providing air to the cathode side of the fuel cell, and a second air blower providing a controlled stream of air to the burner. Hence, the anode exhaust stream of the fuel cell is not diluted by the air from the cathode exhaust stream of the fuel cell, instead the anode exhaust stream is oxidized in the burner together with the fresh air provided by the second blower. The anode exhaust stream that contains remaining of the unburnt fuel of the fuel cell is directed into the burner alongside with some fresh air provided with the second blower. As a result, the total amount of fluid flow in the burner is kept lower compared to conventional approaches such as U.S. Pat. No. 4,943,493, WO 2014/171265 A1 or US2003224231A1 where the cathode and anode outlet streams are mixed for post-combustion. The embodiment according to the invention has therefore the advantage that a relatively small burner is needed to burn the anode exhaust stream.

A further advantage is that the feed of the fresh air into the burner with an additional blower makes it easier to control the flame temperature in the burner as the amount of the oxygen required for the combustion can be regulated easier. Furthermore in a preferred embodiment, a relatively small heat exchanger or condenser, in particular with a low pressure drop, is needed downstream the burner or downstream the anode to condense the water from the burner exhaust stream after the burner or from the anode exhaust stream after the anode.

Preferably the stream after the burner has a high dew point, the temperature at which condensation starts, so that sufficient condensation can be guaranteed at the condenser. This stream is entirely independent from the cathode flow rate.

The flow rate of the fresh air required to complete combustion in the burner is independent and significantly lower than the flow rate of air at the cathode side of the stack. Hence the amount of water condensed in the condenser is mainly related to the temperature of the cooling media used in the condenser and not the cathode flow rate. Some numerical examples are shown in the next paragraphs for clarification. For example, for the particular example proposed, the flow rate of air on the cathode side is around $3.4 \times 10^{-2}$ [kg/s] whereas the flow rate of the fresh air for the burner is around $6.2 \times 10^{-4}$ [kg/s]. Therefore, keeping the anode exhaust stream and the cathode depleted air stream separate allows improved control of the burner, and improves condensation of water and improves the generation of steam.

Another important advantage to consider is that after long hours of operation of an SOFC system, the system starts to degrade and heat generated inside the stack increases, hence, flow rate of air on the cathode side may increase to overcome temperature raise in the stack. For the configuration proposed in the U.S. Pat. No. 4,943,493 and WO 2014/171265 A1, this would reduce the dew point of the stream, which would limit the amount of water condensed for the evaporator.

Long term experimental evidences showed that there are some impurities in the condensed water especially in configurations where the cathode and anode stream are mixed immediately after the stack, for example, WO 2014/171265 A1. These impurities mainly come from the material used in the SOFC balance of plant and the stack itself, which have negative influence and increase degradation rate of the stacks. Therefore, it is essential to filter them out and purify the condensed water before sending it back to the evaporator. In the case of WO 2014/171265 A1 the condensed water returns back to the evaporator without any filters, however, the advantage of the current invention is that the condensed water can be filters and send back to the evaporator afterwards. This in its turn eliminates the need for an external water source for the system.

In another embodiment according to the invention the anode off-gas from the stack is not sent directly to the burner, whereas the heat is recovered inside the system and the stream is sent directly to a condenser. Afterwards the condensed water is used for the evaporator which is fed back into the system. The rest of the gas, which can be called dry-gas, is fed into the burner to complete the combustion. Experimentally it has been seen that burning a fuel with some steam or other media is more difficult in order to guarantee a complete combustion. However an advantage of this approach is that most of the steam from the anode off-gas is removed and the amount of water in the dry-gas is minimized. This in its turn and the use of fresh air for the burner assists to have a smooth and complete combustion at the burner.

The advantage of separating the water from the burner exhaust stream is that the water can be fed back into the reformer. As a result, the need for an external water source for the system can be eliminated.

In the embodiment disclosed in U.S. Pat. No. 4,943,493 the depleted air stream of the cathode outlet of the fuel cell along with some fresh air is fed to the burner to complete combustion. The reminder of the oxygen in the depleted air stream of the cathode outlet, which means the cathode exhaust stream is utilised to complete combustion in the burner. However, some of the disadvantages of this approach are that there is a need to split or create a back pressure on the cathode line, for example by using a modulating valve, in order to divide the flow correctly. This makes it even more complicated or challenging to control the SOFC system, in particular if there is a continuous load modulation in the SOFC system. A load modulation changes the amount of electrical load applied to the fuel cell and it changes the flow and in case of varying fuel utilization the amount of unburnt fuel in the anode exhaust stream, hence, the amount of air needed in the burner. One advantage of the system and method according to the invention is that a load modulation can easily be controlled because the amount of air provided to the burner can be adjusted easily by simply control of the second blower.

Another advantage of the invention is that the embodiment according to the invention can be implemented in SOFC systems with different layouts, for example, anode recirculation, with minimum cost and modifications.

The embodiment according to the invention has the advantage that an outlet of poisonous or combustible gases can be avoided, because all poisonous or combustible gases of the anode exhaust stream have to pass through the burner. In one embodiment of the invention, the anode exhaust stream is directly fed to the burner. In a second embodiment of the invention, water is depleted from the anode exhaust stream before feeding the water depleted anode exhaust stream to the burner. Also in this second embodiment, all poisonous or combustible gases of the anode exhaust stream have to pass through the burner.

Various objectives, features, aspects and advantages of the present invention will become more apparent from the following detailed description of a preferred embodiment of the invention, along with the accompanying drawings in which like numerals represent like components.

DESCRIPTION OF PREFERRED EMBODIMENTS

Figure 1:
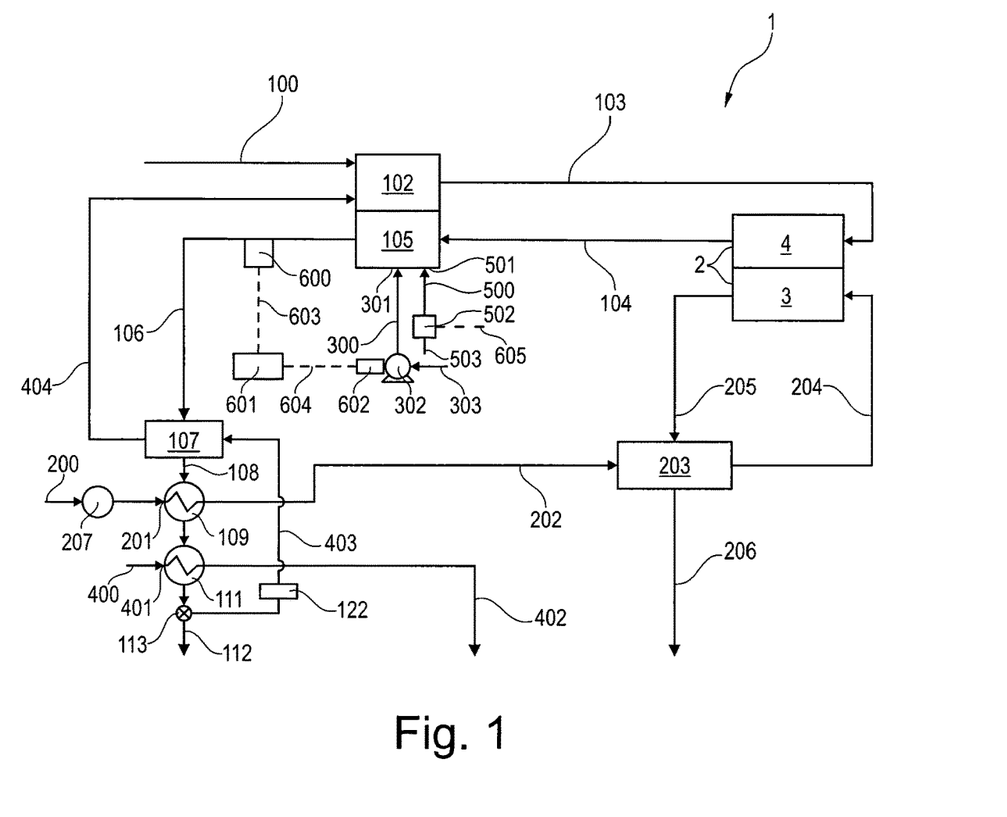
FIG. 1 shows a schematic representation of a SOFC system according to the invention.

FIG. 1 is a schematic diagram of a first embodiment of a SOFC system 1 according to the invention. A gaseous hydrocarbon stream 100 and a stream of steam 404 is fed into a reformer 102, wherein the gaseous hydrocarbon stream 100 and steam is converted into reformate fuel containing hydrogen and carbon monoxide gases to produce a hydrogen rich gas. A stream of hydrogen rich gas 103 is directed from the reformer 102 to an anode 4 of a solid oxide fuel cell stack 2. A stream of preheated cathode air 204, provided by a first air blower 207, is directed to a cathode 3 of the solid oxide fuel cell stack 2. The hydrogen of the hydrogen rich gas 103 is oxidized in the solid oxide fuel cell stack 2 to produce electricity, a hydrogen depleted anode exhaust stream 104, which exits the anode 4 of the fuel cell 2, and an oxygen depleted cathode exhaust stream 205, which exits the cathode 3 of the fuel cell 2. The anode exhaust stream 104 and the cathode exhaust stream 205 are not mixed but are kept separate. The anode exhaust stream 104 is directed to a burner 105. A fresh air stream 300, provided by a second air blower 302, is also fed to the burner 105. The burner 105 combusts a mixture of the anode exhaust stream 104 and the fresh air stream 300 to produce heat for the reformer 102 and to burn the exhaust gas. The burner exhaust gas exits the burner 105 as a burner exhaust stream 106. The exhaust stream 106 is cooled down in at least one heat exchanger 107, 109, 111 to condense water. In a separator 113 the condensed water 403 is separated, so that an exhaust gas 112 remains. The burner exhaust stream 106 heats the condensed water 403 in the heat exchanger 107, which is an evaporator, such that steam 404 is generated. An oxygen sensor 600 is provided to sense the oxygen content of the burner exhaust stream 106, in one embodiment in particular to make sure that the burner exhaust stream 106 has sufficient heat to generate steam 404. In a preferred embodiment a filter 122 may be arranged to filter the condensed water 403 from impurities, in particular from impurities coming from the material used in the SOFC balance of the plant and the stack itself. In a further preferred embodiment the SOFC system 1 has no filter 122, so that no filter 122 is arranged between the separator 113 and the evaporator 107.

The operation of the SOFC system according to the first embodiment comprises the following steps:
- reforming a gaseous hydrocarbon stream 100 and steam 404 into a hydrogen rich gas 103,
- electrochemically reacting the hydrogen rich gas 103 and a cathode air stream 204 in a solid oxide fuel cell stack 2 to produce electricity, an anode exhaust stream 104 and a cathode depleted air stream 205,
- keeping the anode exhaust stream 104 and the cathode depleted air stream 205 in separate streams,
- supplying the anode exhaust stream 104 or the water depleted anode exhaust stream 104 to a burner 105,
- supplying a fresh air stream 300 to the burner 105 to provide enough air for a complete combustion in the burner 105,
- and burning a combustion mixture of the anode exhaust stream 104 and the fresh air stream 300 to provide heat to the reformer 102 to pre-reform the gaseous hydrocarbon stream 100 and to produce a burner exhaust stream 106,
- cooling down the anode exhaust stream 104 or the burner exhaust stream 106 to condense water 403, and
- evaporating the condensed water 403 using the burner exhaust stream 106 to produce steam 404.

The temperatures in the SOFC system 1 may for example be as follows:
The burner exhaust stream 106 may have a temperature in the range of 900° C. to 1000° C. The condensed water 403 may have a temperature in the range of 50° C. to 60° C. The steam 404 may have a temperature in the range of 300° C. to 500° C.

In the embodiment disclosed in FIG. 1 the oxygen content of the burner exhaust stream 106 is sensed by the oxygen sensor 600 and a signal indicative of the oxygen content of the burner exhaust stream 106 is provided. A blower 302 for controlling the mass flow rate of the fresh air stream 300 is controlled by a controller 601, based on the provided signal of the oxygen sensor 600 to maintain the oxygen content of the burner exhaust stream 106 within a preselected range.

In a preferred embodiment the temperature in the reformer 102 may also be controlled. An important parameter that plays a vital role in operation of a SOFC system 1 such as the one depicted in FIG. 1 is the fuel reforming rate inside the reformer 102. This is usually referred to as the pre-reforming rate.

The pre-reforming rate in a SOFC system 1 may vary and it depends mainly on the system layout, stack design and developer's expectation and most important on the temperature in the reformer 102. For instance, in the embodiment discussed in FIG. 1 the pre-reforming rate is assumed to be 50%. There are well known standard thermodynamic tables and plots that show equilibrium temperature for different reforming rates. For example, for a steam to carbon (s/c) ratio of 2, it means the molar ratio of steam to carbon in the reformer is 2, at 360° C. temperature in the reformer 102 a pre-reforming rate of 10%, and at 640° C. a pre-reforming rate of 78% can be achieved. There is a direct correlation between the temperature in the reformer 102 and the reforming rate and it is therefore obvious that by reducing the temperature the reforming rate will also reduce.

To provide an optimal operating condition for the reformer 102 it is vital to control properly the flame temperature of the burner 105 and to control the composition of the burner exhaust stream 106.

A complete combustion in the burner 105 can be achieved by directly or indirectly measuring the flame temperature in the burner 105 and by controlling the provided amount of oxidant. A too low temperature of the flame temperature would cause an incomplete combustion, hence, traces of some poisonous gases, especially CO, may remain in the burner exhaust stream 106 and also not enough heat would be provided for the reformer 102. On the other hand, a too high temperature of the flame temperature may cause some thermal and mechanical stresses on the burner liner materials, in particular metal and the catalyst.

It is therefore preferred to maintain the temperature of the flame and the temperature of the liner materials, in particular metal, of the burner 105 within a desired range of preferably 1100° C. to 1400° C. However, several factors affect the temperature and controllability of the burner, especially the temperature of the flame.

Figure 2:
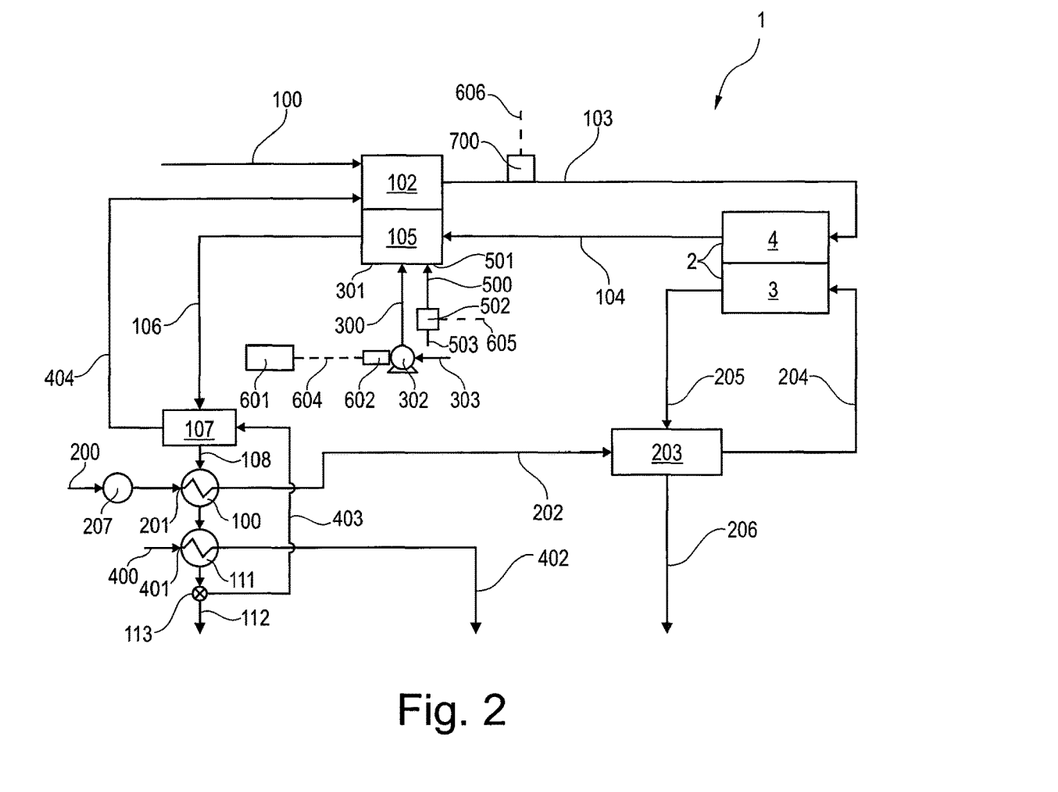
FIG. 2 shows a schematic representation of a further SOFC system according to the invention.

Furthermore, the amount of heat that is generated in the burner 105 and transferred to the reformer 102 dictates the pre-reforming rate in the reformer 102, hence the temperature of the reformer outlet, the hydrogen rich gas 103. FIG. 2 shows a further embodiment where the temperature of the hydrogen rich gas 103 is measured by a temperature sensor 700 that is implemented on the line that measures temperature of the hydrogen rich gas 103 continuously during operation of the system. The temperature sensor 700 is connected by a control cable 606 to the controller 601.

The amount of heat generated in the burner 105 and transferred to the reformer 102 depends on the amount of fuel that is burnt in the burner 105. In the embodiment according to FIG. 2, there are two sources of fuel, the anode exhaust stream 104 and the make-up line 500. The anode exhaust stream 104 contains remaining of the fuel that is not consumed inside the fuel cell 2, which can vary based on the fuel utilization inside the fuel cell 2. The make-up line 500 is connected via a controllable valve 502 to a source 503 of fresh methane.

The fuel cell systems are usually designed to be thermally self-sustaining and to eliminate the need for any fuel externally. However, if there is a need for additional fuel for example during start of the fuel cell system, the make-up line 500 can be used. Otherwise, the temperature of the burner 105 and the reformer 102 would decrease if not enough fuel and heat was provided, which in its turn would reduce the predefined pre-reforming rate. The fuel cell systems disclosed in FIGS. 1 and 2 do not necessarily need a make-up line 500 as disclosed during nominal operation, the make-up line 500 is used only during start of the system from room temperature.

Figure 3:
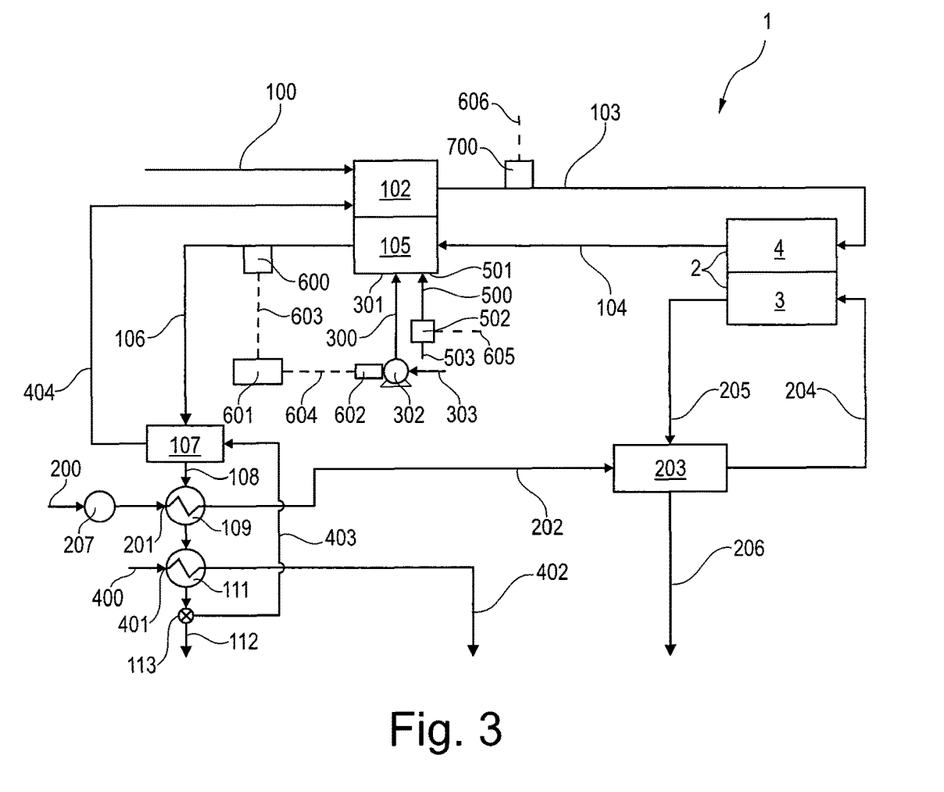
FIG. 3 shows a schematic representation of a further SOFC system according to the invention.

To have a complete controllability over the system, in the embodiment according to FIG. 2 the temperature of the hydrogen rich gas 103 is measured during operation of the system by a temperature sensor 700. The amount of fuel that enters the burner 105 from the anode exhaust stream 104 and optionally from the make-up line 500 is controlled by the temperature sensor 700 located on the reformate outlet and the control unit 601. The temperature sensor 700 sends a signal to the control unit 601 and the control unit sets the parameters on valve 502 in order to increase or decrease the fuel flow in the make-up line 500 to the burner. It is important to mention that by increasing the fuel flow in the line 500 the amount of air required for complete the combustion will also increase. In a similar manner explained earlier, the amount of fresh air required to complete the combustion is controlled by the oxygen sensor 600 and the flow rate of the fresh air stream 300. FIG. 3 shows an embodiment using an oxygen sensor 600 as described with FIG. 1 and using a temperature sensor 700 as described with FIG. 2.

To maintain the flame temperature within a desired range a first method using the embodiment disclosed in FIG. 1 is described. In this first method the anode and cathode exhaust streams 104, 205 are kept separate and the anode exhaust stream 104 is mixed with a fresh air stream 300 provided by the second air blower 302. An oxygen sensor 600 is used to measure the oxygen of the burner exhaust stream 106.

The sensor 600 for sensing the oxygen content of the burner exhaust stream 106 is sensing the oxygen concentration. A control unit 601 is connected to the sensor 600 via a control cable 603. An actuator 602 is connected to the control unit 601 via a control cable 604. The blower 302 is driven by the actuator 602. The control unit 601 is responsive to the sensor 600 and controls the blower 302 for controlling the mass flow rate of the fresh air stream 300 to maintain the oxygen content of the burner exhaust stream 106 within a preselected range. The blower 302 is driven by an actuator 602. Air 303 passes through the blower 302 so that the fresh air stream 300 is fed at a fresh air stream inlet 301 into the burner 105.

The flame temperature in the burner 105 can be evaluated theoretically by a modelling tool. The embodiment according to FIG. 1 is used for theoretically calculating the flame temperature.

The embodiment disclosed in FIG. 1 may be operated such that the reformer 102 is used to pre-reform 50% of the fuel 100, and the rest of the fuel is converted inside the SOFC stack 2 through internal reforming. In order to achieve 50% pre-reforming rate the temperature of the hydrogen rich gas 103, which means the reformate outlet, needs to be 556° C. This is achieved with the control unit 601 that monitors temperature at thermocouple 700.

The anode exhaust stream 104 comprise of steam, carbon dioxide and rest of the hydrogen that is not consumed inside the stack 2. Fuel utilization of the stack 2 is varied between 70-80%, which influences the heat generated in the burner and the amount of air required in the burner 105 for oxidation.

Due to reasons explained earlier it is important to have a certain amount of air in the burner exhaust stream 106. This is generally related to the amount of air of the fresh air stream 300 that is fed into the burner 105. Whilst doing theoretical calculations it is a good practice to keep a stoichiometric value for the air, which is usually between $\lambda=1.2~1.4$. This means the amount of air fed 300 into the burner 105 is typically more than the theoretical calculation; hence, some oxygen will remain unused at the outlet in the burner exhaust stream 106. For this operating condition, it has been found that the flame temperature can vary between 1100-1400° C. However, by taking a stoichiometry value of exactly $\lambda=1$, no more oxygen will remain at the outlet of the burner 105 and this may lead to an incomplete combustion and temperature of the burner may exceed the temperature resistance of the burner liner.

With the use of an oxygen sensor 600 the amount of oxygen at the burner outlet in the burner exhaust stream 106 is preferably kept between certain values. Experimentally and also theoretically is has been found that with a value in the range between 1.1~2.2% mole a complete combustion can be guaranteed. Having an oxygen content of more than the upper limit of 2.2% in the burner exhaust stream 106 would cause a decrease of temperature in the burner and having oxygen content of less than the lower limit of 1.1% would increase temperature of the burner. In either cases flame temperature can be out of the desired range and a complete combustion cannot be guaranteed.

Measuring the actual flame temperature in the burner can be a very challenging and tedious task. The thermal inertia of the burner and also positioning of thermocouple inside the burner can easily influence this measurement. In order to make sure the flame temperature falls in the range specified above and also to assure a minimum amount of oxygen at the outlet of the burner the flow rate of the fresh air 300 is regulated directly. That is the content of the oxygen is measured by sensor 600 and the air flow rate is adjusted with the actuator 602.

Operation of the embodiment disclosed in FIG. 1 was modelled for various operating condition. Two sets of results are disclosed for further details. In the first case, shown in table 1, the fuel utilization in the fuel cell stack 2 was 80% and in the second case, shown in table 2, the fuel utilization in the fuel cell stack 2 was 70%. Obviously, other operating conditions such as operation at part load can also be considered, however, this is not presented here.

TABLE 1

Fuel Utilization 80%

| | Anode Outlet (exhaust stream 104) | Burner Outlet (exhaust stream 106) | Burner Outlet (exhaust stream 106) |
|---|---|---|---|
| Gas Composition (%) | | | |
| O2 | 0 | 1.1 | 2.1 |
| N2 | 0 | 25.5 | 28.2 |
| H2O | 65.3 | 59.2 | 56.3 |
| CO2 | 19.3 | 14.2 | 13.4 |
| CO | 0.2 | 0 | 0 |
| H2 | 15.4 | 0 | 0 |
| CH4 | 0 | 0 | 0 |
| Fresh Air (stream 300) | | | |
| Mass Flow Rate (Kg/s) | | $4.1 \times 10^{-4}$ | $4.8 \times 10^{-4}$ |
| Volume Flow Rate (L/min) | | 19.1 | 22.4 |
| Corresponding Theoretical ($\lambda$) | | 1.2 | 1.4 |
| Calculated Flame Temperature (° C.) | | 1262 | 1217 |
| Dew Point (° C.) | | 85.8 | 84.5 |
| Mass Flow Rate (Kg/s) | $6.6 \times 10^{-4}$ | $1.1 \times 10^{-3}$ | $1.2 \times 10^{-3}$ |

TABLE 2

Fuel Utilization 70%

| | Anode Outlet (exhaust stream 104) | Burner Outlet (exhaust stream 106) | Burner Outlet (exhaust stream 106) |
|---|---|---|---|
| Gas Composition (%) | | | |
| O2 | 0 | 1.5 | 2.8 |
| N2 | 0 | 33.7 | 36.7 |
| H2O | 57.6 | 52.3 | 48.9 |
| CO2 | 19.4 | 12.5 | 11.6 |
| CO | 0 | 0 | 0 |
| H2 | 23 | 0 | 0 |
| CH4 | 0 | 0 | 0 |
| Fresh Air (stream 300) | | | |
| Mass Flow Rate (Kg/s) | | $6.2 \times 10^{-4}$ | $7.2 \times 10^{-4}$ |
| Volume Flow Rate (L/min) | | 28.9 | 33.6 |
| Corresponding Theoretical ($\lambda$) | | 1.2 | 1.4 |
| Calculated Flame Temperature (° C.) | | 1410 | 1338 |
| Dew Point (° C.) | | 82.6 | 81 |
| Mass Flow Rate (Kg/s) | $6.2 \times 10^{-4}$ | $1.2 \times 10^{-3}$ | $1.3 \times 10^{-3}$ |

In both cases the flow rate of the fresh air 300, calculated stoichiometry values and the flame temperature are presented. By regulating the fresh air stream 300 the molar fraction of oxygen is kept between 1.1-2.8% which in turn keeps the flame temperature in the burner 105 at the predefined range of 1217-1410° C. Based on these results the method for controlling the flame temperature is such that the oxygen content of the burner exhaust stream 106 is measured by sensor 600, and the air flow rate of the fresh air stream 300 is adjusted with the actuator 602 such, that the molar fraction of oxygen is kept between 1.2-2.7%. By using this method the flame temperature in the burner 105 is kept within the range of between 1217-1410° C.

Furthermore, the dew point of the burner outlet exhaust stream 106 is presented for each case. As mentioned previously, one of the main advantages of separating the anode and cathode exhaust streams 104, 205 from each other is that the dew point of the stream at anode outlet is high and the steam in the line can be condensed with smaller condensers. Enhanced condensation and water recovery is an important aspect in SOFC system as the need for an external water source can be eliminated. On the other hand combining the anode and cathode streams would reduce the dew point of the mixture and the amount of water that can be condensed at the burner outlet. The dew point of the gas mixture at the burner outlet is presented for all cases and it is obvious that condensation starts at temperatures around 80° C.

The next paragraphs explain a second method in details. The embodiment for the second approach is shown in FIG. 2. There is no oxygen sensor at the burner outlet, however, the temperature sensor 700 and the controller 601 are kept as before. As mentioned previously, the amount of air required in the burner 105 is evaluated by some theoretical calculations. The following two tables detail step by step conversion of gas input into the same fuel cell system embodiment and at the last column the amount of fresh air required to complete combustion is evaluated.

Some assumptions need to be considered for such calculations based on the design and experimental data available from the developers; some of them summarized in tables 4 and 5. The steam reforming and water-gas shift reactions are presented as follows:

TABLE 3

| | |
|---|---|
| $CH_4 + H_2O \rightarrow 3H_2 + CO$ | (Steam Reforming Reaction) |
| $CO + H_2O \leftrightarrow H_2 + CO_2$ | (Water Gas Shift Reaction) |
| $CH_4 + 2H_2O \rightarrow 4H_2 + CO_2$ | (Complete Reaction) |

The double headed arrow represents that the water-gas shift reaction is in equilibrium. It means, at the end of the reaction both the reactants and products remain at the equilibrium point. The composition of the gases at equilibrium depends on the initial composition of the reactants and the final reaction temperature and pressure. There are theoretical methods that can be used to evaluate the equilibrium composition, which is out of scope of this document and will not be discussed here. The values that are presented here for calculation are collected from some experimental results and it may vary for different equipment. For instance, some stacks are limited with the amount of internal reforming, or the water-gas shift reaction is not always in equilibrium in the reformer or the stack; therefore, these values need to be adjusted accordingly based on experimental data.

In the fuel reformer 102 it is assumed that the pre-reforming and the water-shift reaction ratio is 50% for both. Whereas in the stack 2 it is assumed that there is a complete internal reforming and the water-shift is 75%.

Composition of the gas at different stages in the system is evaluated in the following tables 4 and 5. That is the gas input into the fuel reformer, i.e. methane and water. The total gas input is around 5 kW. As explained earlier, inside the fuel reformer by implementing the steam reforming and water-gas shift reactions composition of the outlet gas can be evaluated. Since it is assumed there is a complete internal reforming inside the stack an additional step is considered at the inlet of the stack, where remaining of the methane that is not reformed in the reformer 102 is converted completely. Composition of the gas at the outlet of the stacks is evaluated based on the fuel utilization, internal reforming and water-gas shift reaction. Finally, at the outlet the amount of air 300 required to burn the remaining of the fuel is calculated based on a standard lambda burner.

TABLE 4

| | | | | | | |
|---|---|---|---|---|---|---|
| | | | Stack fuel utilization 80% | | | |
| | | | Assumptions | | | |
| | | S/C (mol) = 2 | Uf = 80% | | | |
| | | Pre-Reforming = 50% | Internal-Reforming = 100% | | | |
| | | Water-Shift = 50% | Water-Shift = 75% | | Lambda = 1.2 | Lambda = 1.4 |
| [Nl/min] | Gas Input | Reformate Outlet | Stack Inlet | Stack Outlet | Combustion Air [Nl/min] | |
| CH4 | 8.4 | 4.2 | 0 | 0 | 0 | 0 |
| H2O | 18.5 | 12.2 | 4.8 | 28.7 | 0 | 0 |
| H2 | 0 | 14.7 | 30.5 | 6.6 | 0 | 0 |
| CO2 | 0 | 2.1 | 5.3 | 8.2 | 0 | 0 |
| CO | 0 | 2.1 | 3.2 | 0.1 | 0 | 0 |
| O2 | 0 | 0 | 0 | 0 | 4.0 | 4.7 |
| N2 | 0 | 0 | 0 | 0 | 15.2 | 17.7 |
| Total | | | | | 19.2 | 22.4 |

TABLE 5

| | | | | | | |
|---|---|---|---|---|---|---|
| | | | Stack fuel utilization 80% | | | |
| | | | Assumptions | | | |
| | | S/C (mol) = 2 | Uf = 70% | | | |
| | | Pre-Reforming = 50% | Internal-Reforming = 100% | | | |
| | | Water-Shift = 50% | Water-Shift = 75% | | Lambda = 1.2 | Lambda = 1.4 |
| [Nl/min] | Gas Input | Reformate Outlet | Stack Inlet | Stack Outlet | Combustion Air [Nl/min] | |
| CH4 | 8.4 | 4.2 | 0 | 0 | 0 | 0 |
| H2O | 18.5 | 12.2 | 4.8 | 25.4 | 0 | 0 |
| H2 | 0 | 14.7 | 30.5 | 9.8 | 0 | 0 |
| CO2 | 0 | 2.1 | 5.3 | 8.2 | 0 | 0 |
| CO | 0 | 2.1 | 3.2 | 0.2 | 0 | 0 |
| O2 | 0 | 0 | 0 | 0 | 6.1 | 7.1 |
| N2 | 0 | 0 | 0 | 0 | 22.8 | 26.5 |
| Total | | | | | 28.8 | 33.6 |

The embodiment according to FIG. 2 is operated by a method wherein the hydrogen rich gas 103 exiting the reformer 102 having a temperature Th, wherein the temperature Th of the hydrogen rich gas 103 is sensed by sensor 700, wherein a pre-reforming rate of the reformer 102 is determined based on the temperature Th and a standard table, and based on information regarding the fuel utilization in the solid oxide fuel cell stack 2, calculating the amount of fuel leaving the stack 2, calculating the amount of air needed for a complete combustion in the burner 105 based on evaluated tables reflecting different stages of the system, and controlling a blower 302 for controlling the mass flow rate of the fresh air stream 300 to maintain the oxygen content of the burner exhaust stream 106 within a preselected range. For example table 4 shows the stage of the system with a water-shift reaction ration of 75%. The stack outlet, disclosed in table 4 discloses the composition of the anode exhaust stream 104. To achieve a complete combustion of the anode exhaust stream 104, which means a combustion that burns all fuel in the anode exhaust stream 104, it is necessary to burn the 0.1 carbon monoxide (CO) and 6.6 hydrogen ($H_2$) of the anode exhaust stream 104, as disclosed in table 4. The amount of air necessary to burn the carbon monoxide and hydrogen of the anode exhaust stream 104 may be calculated and the actuator 602 may be controlled such that the required amount of oxygen or of fresh air 300 is fed to the burner 105.

The total fresh air 300 required to complete the combustion are represented for both cases, the embodiment according to FIG. 1 as well as FIG. 2.

The amount of fresh air 300 for the burner 105 was evaluated in two different methods, disclosed in FIGS. 1 and 2, and it was shown that both approaches are robust and can be used in various fuel cells systems. Furthermore, combination of both techniques disclosed in FIGS. 1 and 2, can be implemented together as shown in FIG. 3, for instance, the oxygen sensor 600 can be used at the outlet of the burner 105 to measure concentration of oxygen and measuring the temperature of the hydrogen rich gas 103, and the theoretical calculation of the pre-reforming rate and the amount of air needed to completely burn the burner exhaust stream 106 can be used simultaneously as a corrective factor. This is usually helpful to develop robust control logic of the system. However, those skilled in the art can judge which method would be appropriate for their application.

In a preferred method, the oxygen content of the combined streams feeding into the burner 105 is maintained within an air-fuel equivalence ratio λ (lambda) of between 1,1 and 1,4, and most preferably of about 1,2. The combined streams feeding into the burner 105 comprises at least the anode exhaust stream 140 and preferably also the second air stream 300 and/or the makeup gas 500.

The FIGS. 1 to 3 show a combination of heat exchanger 107, 109 and 111 in series, so that the burner exhaust stream 106, 108 is cooled down, condensed water 403 is separated and an exhaust gas 112 leaves the SOFC system 1. The condensed water 403 is heated in the heat exchanger 107 and fed as steam 404 into the fuel reformer 102. The burner exhaust stream 106 can be fed in various other ways as disclosed in the FIGS. 1 to 3, to end up as an exhaust gas 112. In FIGS. 1 to 3 the air stream 200 if fed by a first air blower 207 at a cathode air inlet 201 to the heat exchanger 109, is then fed to a cathode heat exchanger 203, before the heated cathode air 202, 204 enters the cathode 3 of the SOFC stack 2. The cathode exhaust stream 205 is fed to the cathode heat exchanger 203 before leaving the system at a cathode exhaust stream outlet 206. A cooling media 400 is entering the heat exchanger 111, which is acting as a condenser, at the cooling media inlet 111, and is leaving at the cooling media outlet 402. The air stream 200 and/or the cooling media 400 can be fed in various other ways through the SOFC system 1, so that FIGS. 1 to 3 show only examples.

Figure 4:
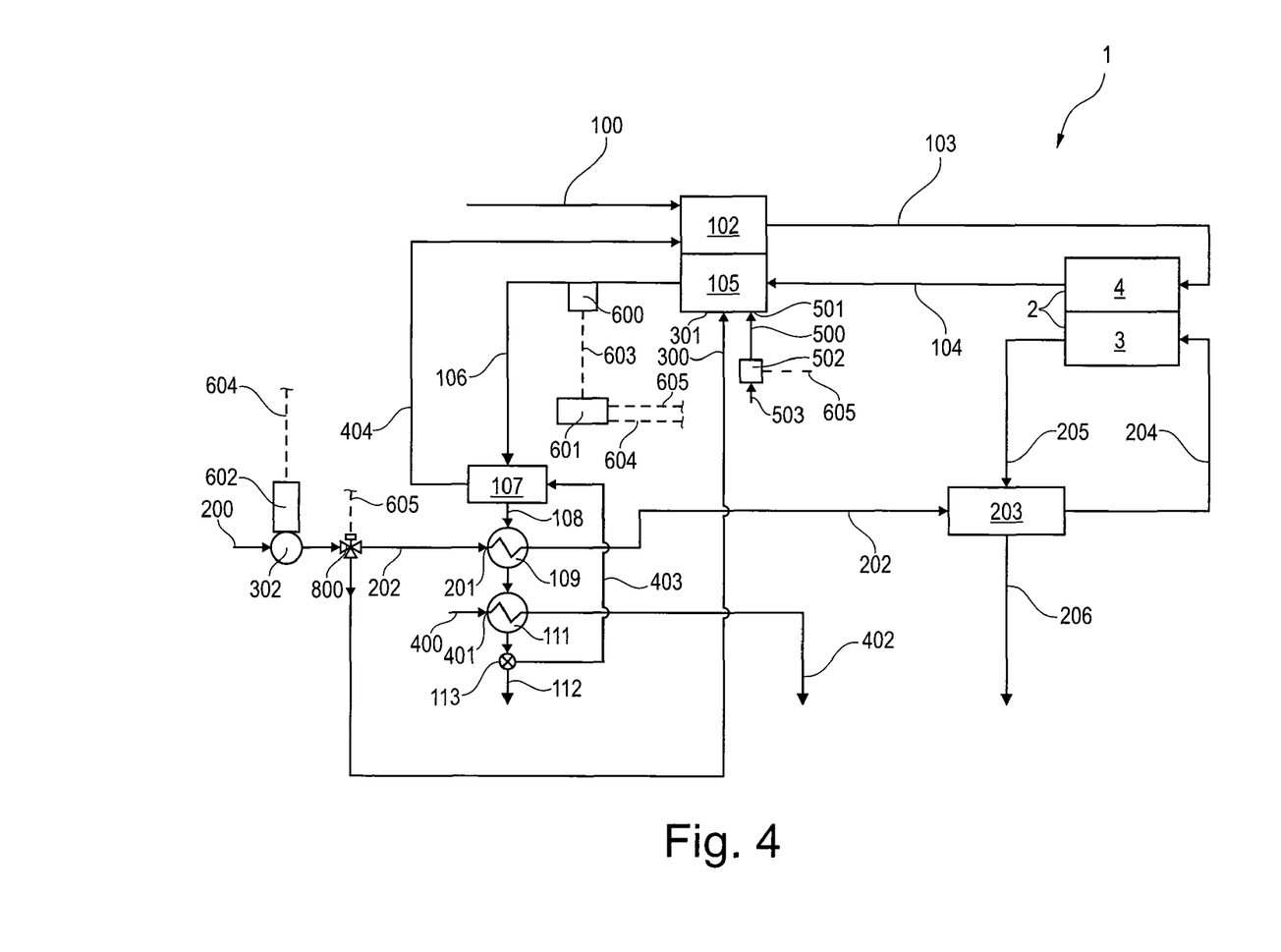
FIG. 4 shows a schematic representation of a further SOFC system according to the invention.

FIG. 4 shows a further embodiment. In order to simplify the SOFC system disclosed in FIG. 1, it is also possible to eliminate blower 207 and use only one single blower, the blower 302 for both air streams 202, 300. As disclosed in FIG. 4, the total amount of fresh air 200 required for the system is provided only by the blower 302. A modulating valve 800, connected to the control unit 601 by the control line 605, is arranged after the air blower 302 in order to split the flow of the fresh air 200 into two separate lines, one air stream 202 for the cathode 3 of the stack and a further air stream 300 for the burner 105. The amount of fresh air required for the burner 105 will be adjusted by regulating the position of the valve 800. If the burner 105 requires more air, the blower 302 increases the amount of fresh air and the position of the modulating valve 800 is adjusted accordingly in order to provide the desired amount of air to the burner 105 and the cathode 3. Obviously, the controllability of such a configuration is more complicated compare to the system disclosed in FIG. 1, especially for systems with continuous load modulation.

Figure 5:
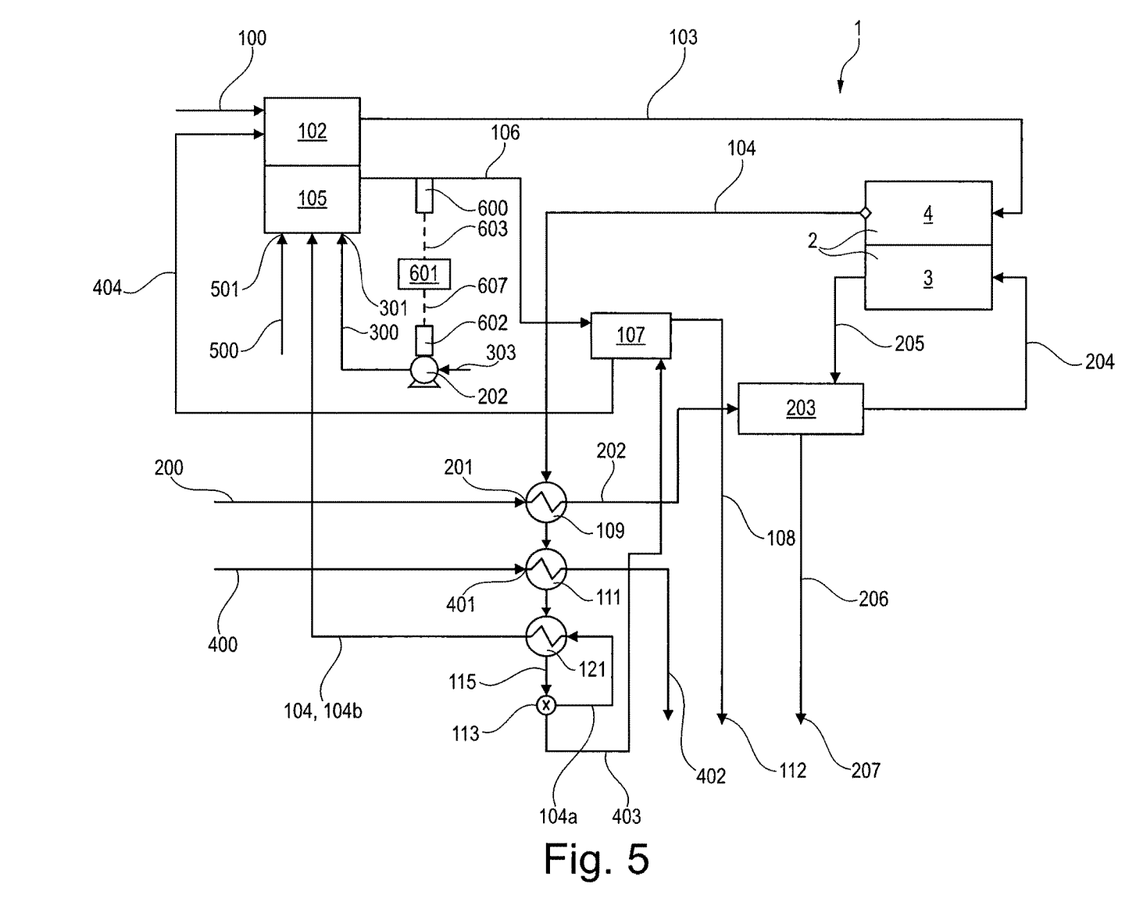
FIG. 5 shows a schematic representation of a further SOFC system according to the invention.

FIG. 5 shows a further embodiment. FIG. 5 shows a combination of heat exchangers 109, 111 and 121 in series, so that the anode exhaust stream 104 is cooled down, condensed water 403 is separated in separator 113 and a water depleted anode exhaust stream 104a is fed to the burner 105. The condensed water 403 is heated in the heat exchanger 107 and fed as steam 404 into the fuel reformer 102. The burner exhaust stream 106 is fed to the heat exchanger, an evaporator, to generate steam 404 out of the condensed water 403. The burner exhaust stream 106, after cooling down in the heat exchanger 107, ends up as an exhaust gas 112. The air stream 200 is handled similar, as already disclosed in FIG. 1. The water depleted anode exhaust stream 104a is heated in heat exchanger 121 to a heated, water depleted anode exhaust stream 104b, and is then fed into burner 105. As already described in FIG. 1, the oxygen content of the burner exhaust stream 106 may be sensed by sensor 600 and controlled by blower 302. In addition, the makeup line 500 may be used to add additional fuel. Sensor 600 and blower 302 and/or makeup line 500 may be used to manage the exhaust stream management, to complete combustion in the burner, and to make sure that there is enough heat in the heat exchanger 107, the evaporator, to generate sufficient steam 404 out of the condensed water 403. In a further embodiment, a filter 122 may be used to filter the condensed water 403, as disclosed in FIG. 1.

The invention claimed is:

1. A SOFC system comprising:
   a fuel reformer for reforming a gaseous hydrocarbon stream and steam into a hydrogen rich gas,
   a solid oxide fuel cell stack including an anode and a cathode for electrochemically reacting the hydrogen rich gas and a cathode air stream to produce electricity, an anode exhaust stream and a cathode depleted air stream, wherein the anode exhaust stream and the cathode depleted air stream are kept separate,
   a burner for combusting a mixture of the anode exhaust stream and a fresh air stream to complete combustion and produce heat for the reformer, wherein the fresh air stream is fed to the burner, wherein
the fuel reformer receiving only the gaseous hydrocarbon stream and steam,
the fuel reformer and the burner being integrated in the same unit for compactness, better heat integration and less heat losses, to generate heat in the burner, which is transferred to the reformer, to control the pre-reforming rate in the reformer,
a control unit and a blower is provided, the control unit being configured to control the mass flow rate of the fresh air stream by blower such that the reformer is provided with heat to reform the gaseous hydrocarbon stream and steam, and such that a burner exhaust stream provides sufficient heat for generating steam,
at least one heat exchanger, which is an evaporator, is arranged after the burner to cool down the burner exhaust stream and to heat condensed water to generate steam,
the steam from the heat exchanger is fed to the fuel reformer,
the burner exhaust stream is cooled down to produce condensed water, so that there is no need for an external water line,
wherein a temperature sensor is arranged for sensing the temperature of the hydrogen rich gas, wherein the control unit is responsive to the temperature sensor to control the blower to maintain the oxygen content of the burner exhaust stream within a preselected range in order to provide sufficient heat to the reformer.

2. The SOFC system according to claim 1, wherein the burner exhaust stream, after passing the evaporator, is fed to at least one additional heat exchanger to cool down and condense the burner exhaust stream to produce a cooled burner exhaust stream comprising condensed water, and wherein the cooled burner exhaust stream is fed to a separator to separate the cooled burner exhaust stream into the condensed water and a residual exhaust gas.

3. The SOFC system according to claim 1, further comprising a second gaseous hydrocarbon stream being connected with the burner to provide additional heat during heat up phase of the system.

4. The SOFC system according to claim 1, wherein after the blower a valve is arranged, wherein the valve is controlled by the control unit, and wherein the valve splits an air stream into the cathode air stream and the fresh air stream.

5. The SOFC system according to claim 1, wherein a filter is arranged to filter the condensed water.

6. A method for operating a SOFC system comprising: reforming a gaseous hydrocarbon stream and steam into a hydrogen rich gas, electrochemically reacting the hydrogen rich gas and a cathode air stream in a solid oxide fuel cell stack to produce electricity, an anode exhaust stream and a cathode depleted air stream, keeping the anode exhaust stream and the cathode depleted air stream in separate streams, supplying the anode exhaust stream to a burner, supplying a fresh air stream to the burner, and burning a combustion mixture of the anode exhaust stream and the fresh air stream to provide heat to the reformer
wherein in providing two streams only, a gaseous hydrocarbon stream and steam to the fuel reformer to pre-reform the gaseous hydrocarbon stream and steam,
controlling a blower by a control unit to control the mass flow rate of the fresh air stream to provide enough air for a complete combustion in the burner and such that the reformer is provided with sufficient heat to reform the gaseous hydrocarbon stream and steam and sufficient heat to produce a burner exhaust stream having sufficient heat for generating steam, cooling down the burner exhaust stream to produce condensed water, and heating the condensed water by the burner exhaust stream to generate the steam, so that there is no need for an external water line,
wherein the hydrogen rich gas exiting the reformer having a temperature (Th), sensing the temperature (Th) of the hydrogen rich gas, determining a pre-reforming rate of the reformer based on the temperature (Th) and a standard table, based on information regarding the fuel utilization in the solid oxide fuel cell stack, calculating the amount of fuel leaving the stack, calculating the amount of air needed for a complete combustion in the burner, and controlling a blower for controlling the mass flow rate of the fresh air stream to maintain at least one of the flame temperature and the oxygen content of the burner exhaust stream within a preselected range.

7. The method of claim 6, wherein the burner exhaust stream having an oxygen content, sensing the oxygen content of the burner exhaust stream, providing a signal indicative of the oxygen content of the burner exhaust stream, and controlling a blower for controlling the mass flow rate of the fresh air stream to maintain at least one of the flame temperature and the oxygen content of the burner exhaust stream within a preselected range.

8. The method of claim 6, wherein the burner exhaust stream passes the evaporator so that steam is generated from the condensed water, wherein after passing the evaporator the burner exhaust stream is cooled down to produce a cooled burner exhaust stream and condensed water, and separating the cooled burner exhaust stream into the condensed water and a residual exhaust gas.

9. The method of claim 6, wherein the oxygen content of the combined streams feeding into the burner is maintained within an air-fuel equivalence ratio $\lambda$, (lambda) of between 1.1 and 1.4.

10. The method of claim 6, wherein the burner exhaust stream preheats the cathode air stream to cool down the burner exhaust stream.

11. The method of claim 6, wherein the steam is fed into the fuel reformer.

12. The method of claim 6, wherein an air stream is split by a modulating valve into the cathode air stream and the fresh air.

13. The method of claim 6, wherein the condensed water is filtered from impurities before entering the evaporator.

14. The method of claim 6, wherein the oxygen content of the combined streams feeding into the burner is maintained within an air-fuel equivalence ratio $\lambda$, (lambda) of 1.2.

* * * * *